Oct. 24, 1967 S. SCHALKOWSKY 3,348,374
SUN REFERENCED ORIENTING DEVICES
Filed Nov. 13, 1963 4 Sheets-Sheet 1
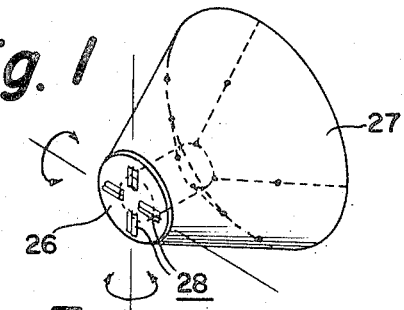
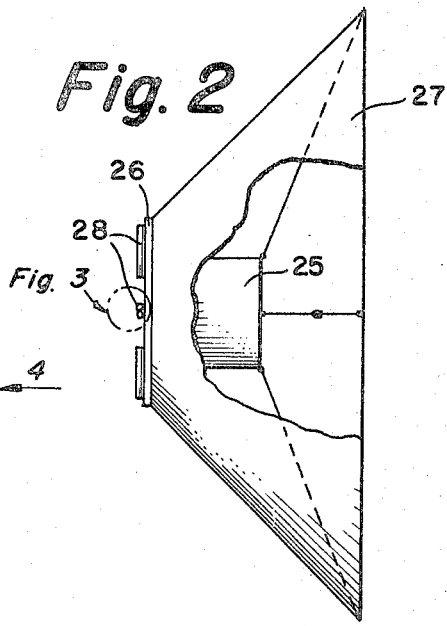
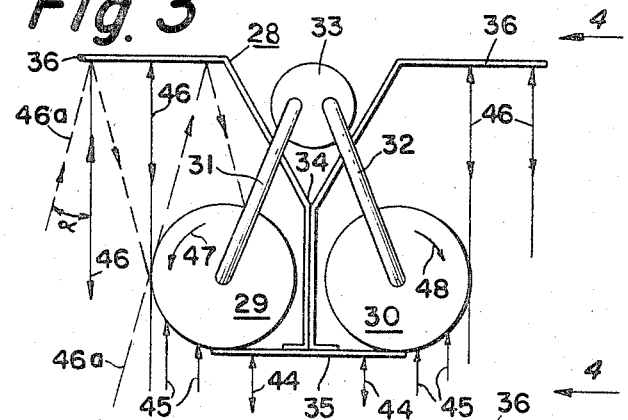
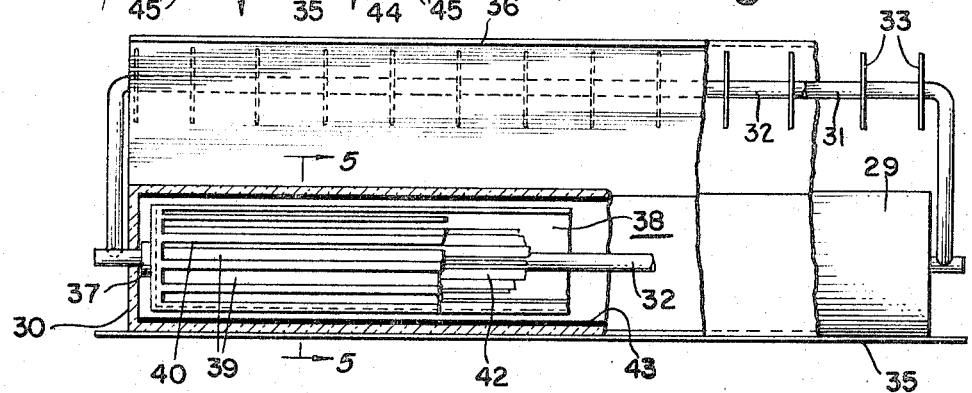
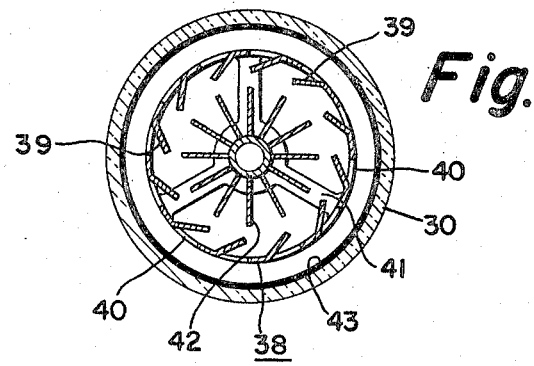
INVENTOR.
SAMUEL SCHALKOWSKY
BY
*Walter B. Udell*
ATTORNEY Oct. 24, 1967     S. SCHALKOWSKY     3,348,374

SUN REFERENCED ORIENTING DEVICES

Filed Nov. 13, 1963     4 Sheets-Sheet 2

INVENTOR.
SAMUEL SCHALKOWSKY
BY *Walter B. Udell*
ATTORNEY

Oct. 24, 1967  S. SCHALKOWSKY  3,348,374
SUN REFERENCED ORIENTING DEVICES
Filed Nov. 13, 1963  4 Sheets-Sheet 3
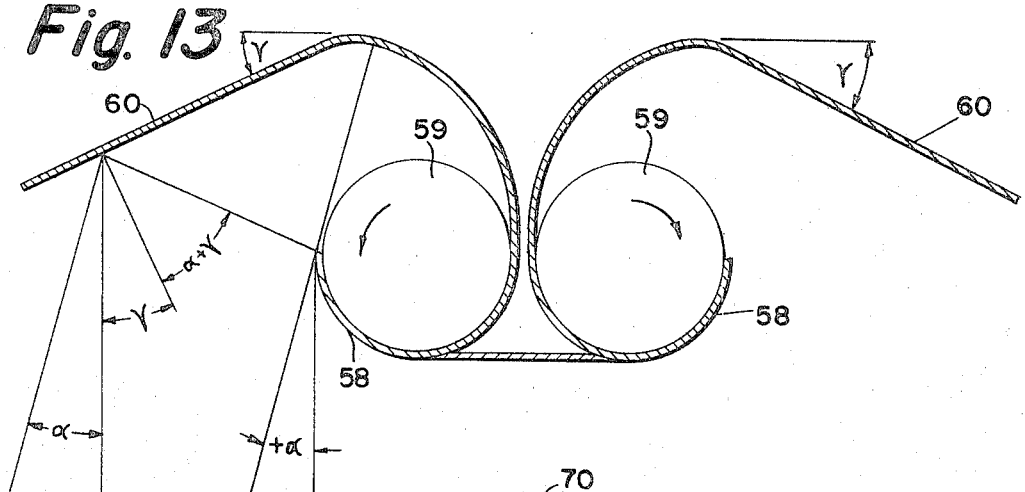
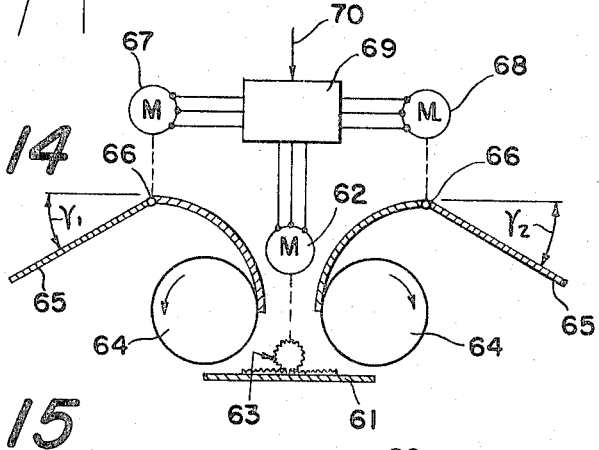
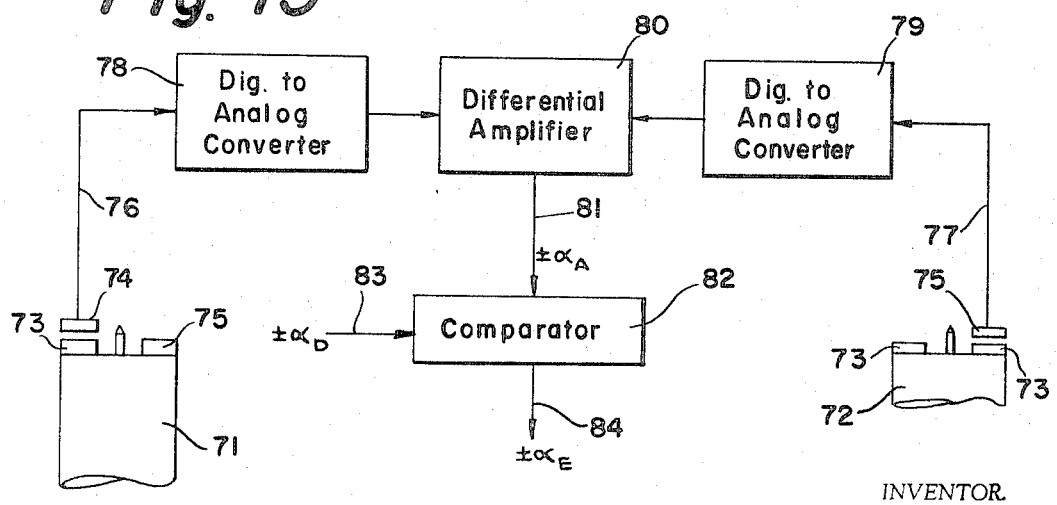
INVENTOR.
SAMUEL SCHALKOWSKY
BY *Walter B. Udell*
ATTORNEY United States Patent Office 3,348,374
Patented Oct. 24, 1967

3,348,374
SUN REFERENCED ORIENTING DEVICES
Samuel Schalkowsky, Radnor, Pa.,
(4003 Woodlawn Road, Chevy Chase, Md. 20015)
Filed Nov. 13, 1963, Ser. No. 323,411
20 Claims. (Cl. 60—26)

This invention relates generally to orienting devices, and more particularly relates to devices for orienting space vehicles with respect to the position of the sun as a reference. Such orientation may desirably be constant so that a particular area of the vehicle always points directly sunward, or the orientation may desirably be variable according to a program. Sunward orientation is obviously important to those vehicles which carry solar operated power generating equipment such as solar cell arrays. Additionally, the thermal design of the space vehicle is considerably simplified since its orientation with respect to the principal source of heat is fixed, and further, solar orientation provides a known inertial orientation which greatly facilitates measurement and instrumentation onboard the vehicle. On the other hand, programmed variability of sunward orientation within reasonable limits can be of considerable importance in some cases, as for example in a fly-by inspection of some celestial body wherein it is desired to achieve a particular orientation of the vehicle to that body for a particular time interval at a specific time or position.

Orientation devices of the conventional momentum transfer type have in the past been used with space vehicles but these devices such as motor-wheel combinations, reaction spheres or fluid flywheels are active systems which require electrical energy to produce the desired torques on the vehicles. Thus, a power supply is required to operate these conventional momentum transfer devices and the signal processing equipment associated therewith which controls the actuation thereof. Unfortunately, the power supply weight required is essentially independent of the required angular momentum capacity of the devices and amounts to about twenty pounds per axis including the weight of the solar cells. Since angular correction of two orthogonal axes is generally required, this leads to a minimum weight of about forty pounds for these active system devices. While forty pounds may be a small fraction of the weight of a large space vehicle, it is a substantial portion for small vehicles weighing on the order of one hundred pounds. Moreover, for such small vehicles the power demand of the orientation system becomes a dominant part of the total power required, and vehicle weight attributable to the orientation system becomes large in relation to overall vehicle weight. Active system control is thus seen to be impractical for low weight vehicles. However, such vehicles may be greatly benefited from sun orientation provided that this is obtainable within reasonable weight limitations.

This invention contemplates the use of passive orienting module devices utilizing balanced radiometric momentum wheel structures which directly convert solar energy to mechanical work and thus eliminate the weight associated with the power supply requirements of the active type controller systems. Radiometric orienting devices on the order of ten pounds or less in weight can readily provide sufficient angular momentum capacity to directly control low weight space vehicles or vehicle subsystems weighing on the order of two hundred pounds, or can function as a fine control for heavier vehicles, the weight of the radiometric orienting device being observed to be a reasonable fraction of the weight to be controlled. Additionally, as will be seen hereinafter, the radiometric devices function as system damping devices which markedly reduce the time for restoration to desired vehicular orientation of vehicles which derive restoring torques from solar radiation pressure by providing an optimum transient response having a slightly oscillatory characteristic with a small overshoot.

Accordingly, it is a principal object of this invention to provide novel passive system sun referenced orienting devices for space vehicles which require no power supply and signal processing equipment, and which are of light weight so that such orienting devices according to the invention are suitable for use with low weight vehicles as well as for fine control functions with those vehicles of sufficient weight to utilize the relatively heavy active momentum transfer systems.

Another object of this invention is to provide novel passive system sun referenced orienting devices for space vehicles as aforesaid which produce a torque proportional to the rate of change of angular misalignment with respect to the sun, whereby damping is provided for the angular motions of vehicles which derive restoring torques from solar radiation pressure.

Yet another object of this invention is to provide novel sun referenced orienting devices which include means for selectively orienting a space vehicle or subsystem thereof at any particular desired angle with respect to the sun within predetermined limits.

Still another object of this invention is to provide novel sun referenced orienting devices as aforesaid of the momentum transfer type which utilize a radiometric momentum wheel structure.

A further object of this invention is to provide novel sun referenced orienting devices as aforesaid which produce torques proportional to the rate of change of angular misalignment with respect to the sun in which the torque gradient may be selected to be either linear or non-linear as desired.

The foregoing and other objects of my invention will appear more fully hereinafter from a reading of the following specification in conjunction with an examination of the appended drawings, wherein:

FIGURE 1 illustrates in perspective a passively stabilized space vehicle configuration utilizing a solar radiation pressure screen and orienting devices according to the invention;

FIGURE 2 is an enlarged side elevation of the vehicle of FIGURE 1 with a portion of the radiation pressure screen broken away to show the vehicle payload housing;

FIGURE 3 is an enlarged end view of one embodiment of a three surface radiometric momentum transfer device according to the invention, and shown diagrammatically located as seen in the phantom circle of FIGURE 2;

FIGURE 4 is a right hand side elevational view of the embodiment of FIGURE 3 as would be seen when viewed in the direction of the arrows 4—4 on FIGURE 3, with parts progressively broken away to show various details of the structure;

FIGURE 5 is an enlarged cross-sectional view through one of the momentum wheels of the radiometric orientation device of FIGURE 3 as would be seen when viewed along the lines 5—5 of FIGURE 4;

Figure 6:
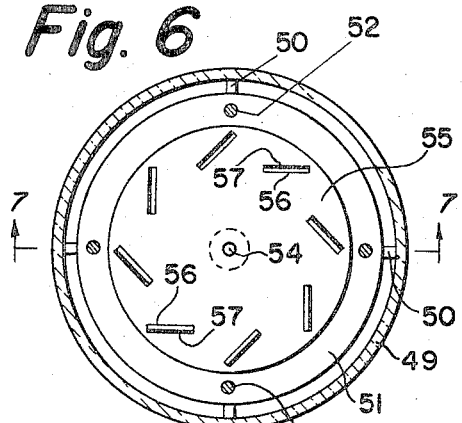
Figure 7:
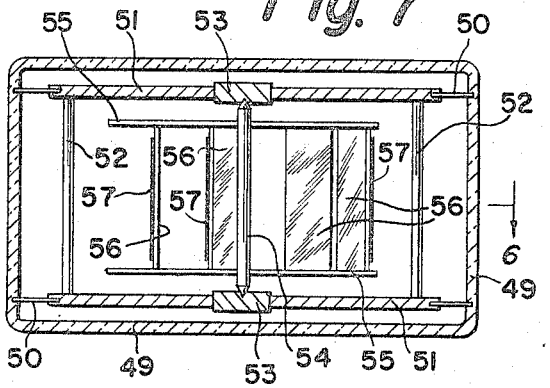
Figure 11:
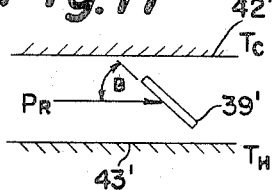
Figure 12:
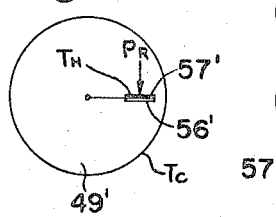
Figure 8:
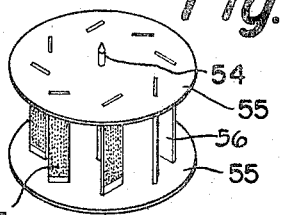
Figure 9:
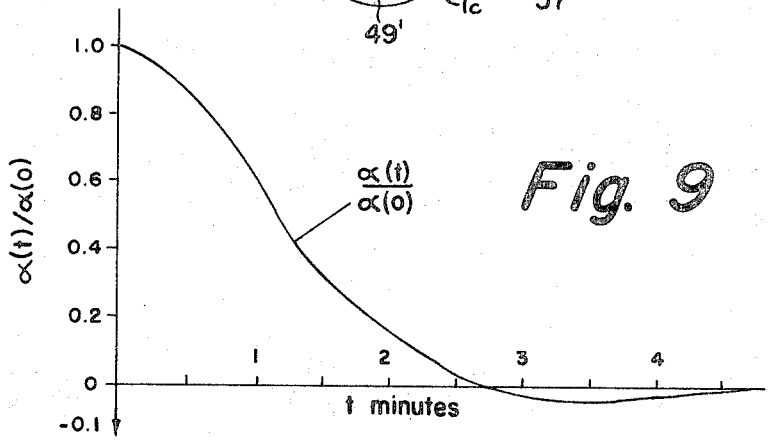
Figure 10:
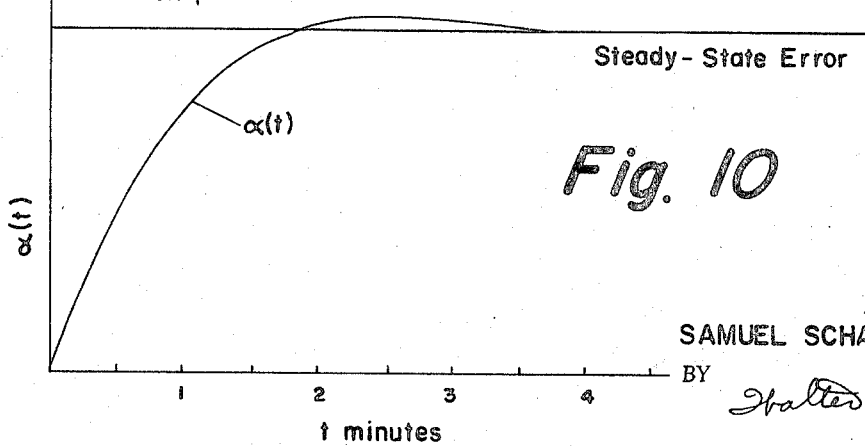
Figure 16:
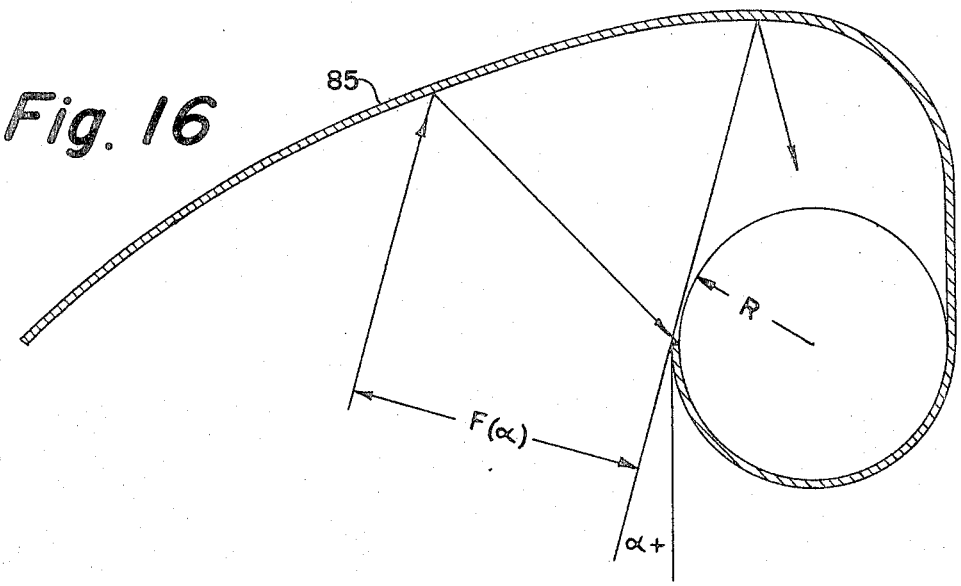
Figure 17:
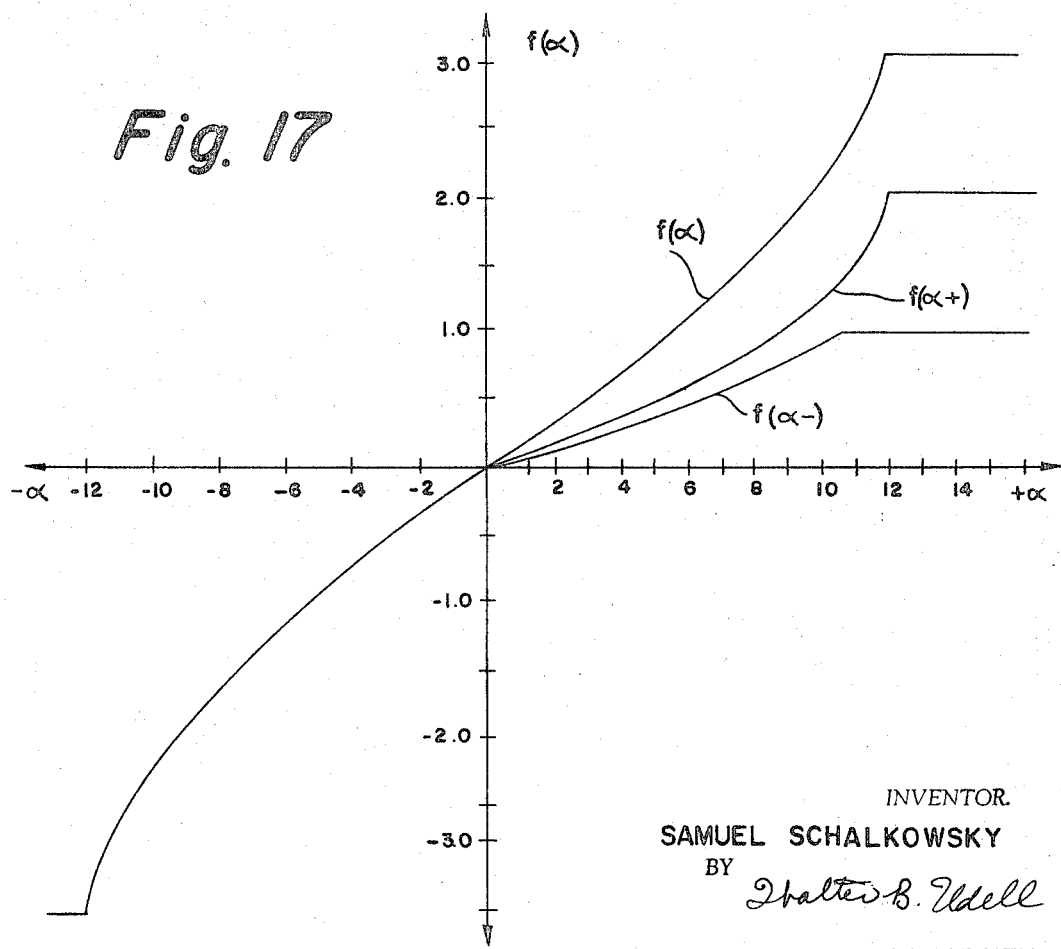

FIGURES 6 and 7 illustrate respectively transverse and axial sectional views taken on one another along the lines 6—6 and 7—7 of a two surface radiometric momentum wheel which could be utilized in the general configuration of FIGURE 3;

FIGURE 8 illustrates on a reduced scale a perspective view of the two surface radiometric momentum wheel shown in section in FIGURES 6 and 7;

FIGURE 9 illustrates the response to an initial angular misalignment of the device of FIGURE 3 when constructed with certain physical constants;

FIGURE 10 illustrates the response to the initial rate of angular misalignment of the device of FIGURE 3 when constructed to give the results of FIGURE 9;

FIGURES 11 and 12 illustrate diagrammatically the basic functional configuration of the three surface and two surface radiometer devices of FIGURES 5 and 6 respectively;

FIGURES 13 and 14 are diagrammatic end views of other embodiments of radiometric momentum transfer devices according to the invention;

FIGURE 15 is a diagrammatic illustration of a system for controlling the embodiment of FIGURE 14;

FIGURE 16 is a diagrammatic end view of one half of a modification of the device of FIGURE 13 specifically designed to produce a non-linear torque gradient as a function of angular misorientation; and FIGURE 17 is a graph of the non-linear torque function of the structure of FIGURE 17.

In the several figures, like elements are denoted by like reference characters.

Turning now to the drawings, consider first FIGURES 1 to 5. FIGURES 1 and 2 illustrate diagrammatically a space vehicle having an instrument payload 25, a solar cell array mount 26, a conical solar radiation pressure surface 27, and a plurality of radiometric momentum transfer devices 28 according to the invention. The solar radiation pressure surface 27 provides a torque which tends to point the mount 26 sunward, but is unable to provide any motion damping since its torque output is proportional only to angular misalignment, and thus its periodicity is relatively long. The devices 28 not only produce sun pointing torques but also damp the angular motion of the vehicle to provide a much faster and better stabilized correction.

Each of the devices 28 includes a pair of radiometric momentum wheels or cylinders arranged so as to counter rotate relative to one another about axes which are either coincident or parallel, these axes being also coincident with or parallel to axes of symmetry of the vehicle configuration in the illustrated case. The counter rotation arrangement is to provide a pair of offsetting equal torques when the device is oriented as desired and is subject to variations in radiation intensity rather than no torque output at all. This provides what might best be termed a push-pull correction effect rather than a single-ended effect when an angular deviation from the desired occurs, this effect resulting from an increase in rotational speed of one momentum wheel simultaneously with a decrease in rotational speed of the other wheel of the pair. This operation will become clearer from an examination of the structure of FIGURES 3, 4 and 5 to which attention should be now directed.

As best seen in FIGURES 3 and 4, which are drawn to full size scale, each of the radiometric momentum transfer devices 28 is a symmetric structure having a pair of side by side radiation transparent cylindrical momentum wheel housings 29 and 30 held in physically fixed position to one another by the thermally conductive tubular supports 31 and 32 which latter extend coaxially through the housings and are themselves rigidly fixed into a composite assembly by the thermally highly conductive and radiative plates 33. The housings may be made of appropriate glass having a wall thickness of one sixteenth of an inch ($\frac{1}{16}''$), while the supports may be one eighth inch ($\frac{1}{8}''$) copper tubing having a one thirty second inch ($\frac{1}{32}''$) wall thickness. The assembly is secured to the vehicle itself by any convenient means which provides for transfer of momentum changes to the vehicle from the device 28. Intervening the housings 29 and 30 for their full length is a Y-shaped reflective support structure 34 which carries at its foot a radiation blocking front reflector 35 and also supports from the free ends of the arms of the Y a pair of radiation amplifying co-planar flat rear reflectors 36.

Disposed concentrically within the housings 29 and 30 on end bearings 37 carried by the tubular supports 31 and 32 are cylindrical momentum wheels 38 of the form best seen in FIGURES 4 and 5, the non-illustrated wheel 38 which is positioned within the housing 29 being turned end-for-end so that its rotational sense will be opposite to that of the wheel within housing 30. The momentum wheels 38 are seen to be in the form of cylindrical sleeves which may be formed of 1.5 mil aluminum foil having vanes 39 cut out of and turned inward from the cylindrical wall at an acute angle to thereby also create openings or windows 40 through the side wall of the cylinder. The vanes may be approximately $\frac{1}{10}''$ in width and about 21 in number although fewer are shown in FIGURE 5 to preserve clarity in the drawing. The ends of the cylinders are provided with support spiders 41 which connect the cylinders to their end bearings 37.

Secured upon the tubular supports 31 and 32 in good thermal contact therewith and extending substantially the full length of and within the cylindrical momentum wheels are thermally conductive finned heat absorbers 42 which may be made of copper. Heat absorbed by the finned structure is transferred to the copper tubular supports 31 and 32 and plates 33 from which latter it is radiated to the relatively cold background. The inside cylindrical surfaces of the housings 29 and 30 are provided with a thin film 43 on the order of 0.1 to 0.5 mil in thickness having radiation absorbing characteristics as close as is practical to a black body, the film thickness determining the thermal time constant. The film such as lamp black or platinum black, may either be deposited directly on the housing inside surface or may be deposited on a foil liner, the latter permitting a small gap between the absorber and the housing which helps reduce thermal conduction to the housing. The housings 29 and 30 are sealed after being pumped down to a gas pressure on the order of $10^{-2}$ torr where the corresponding radiometer pressure is high.

The planes of the reflectors 35 and 36 are parallel to each other and to the plane defined by the parallel rotational axes of the momentum wheels 38, these planes being all orthogonal to the direction of solar radiation when the solar cell mount 26 is pointed exactly sunward. This condition is shown by the radiation designating arrows of FIGURE 3 wherein it is observed that a portion of the radiation intercepted by the devices 28 and designated by arrows 44 is blocked from the momentum wheel housings by front reflector 35, equal portions of the intercepted radiation designated by arrows 45 strike the two housings and the remainder of the intercepted radiation designated by arrows 46 strikes the amplifying reflectors 36 and is reflected therefrom without striking the housings 29 and 30. The equal amounts of intercepted radiation designated by the arrows 45 cause the momentum wheels 38 to counterrotate at equal speed within their housings 29 and 30 in the senses shown in FIGURE 3 by the arrows 47 and 48. These rotations are produced by the radiometer effect to be described. The torques produced by the counterrotating momentum wheels 38 under these conditions are equal and opposite and therefore nullify one another.

The structure shown in FIGURES 3, 4 and 5 and described hereinbefore may be designated as a three surface radiometer device which is shown in functional equivalent form in the diagrammatic showing of FIGURE 11, whereas a two surface radiometer device is shown diagrammatically in FIGURE 12 and structurally in one form in FIGURES 6, 7 and 8. It will be shown hereinafter that the two surface and three surface configurations are functionally equivalent and differ from one another only by a scale factor. Consequently, the two surface configuration of FIGURES 6, 7 and 8 may be utilized in the general organization of FIGURES 3 and 4 as a substitute for the three surface configuration of FIGURE 5.

Referring now to FIGURES 6, 7 and 8, the two surface device is seen to include a cylindrical radiation transparent housing 49 within and from which is supported by anchors 50 an open frame consisting of a pair of spaced apart parallel circular plates 51 physically fixed relative to one another by the spacer rods 52 extending between and secured thereto. Centrally carried by the plates 51 are pivot bearings 53 between which extend and are journalled the opposite needle point ends of pivot shaft 54. Fixedly secured to the pivot shaft proximate the ends thereof for rotation therewith are a pair of parallel plate members 55 between which orthogonally extend a plurality of fixed position vanes 56 of low thermal conductivity, such as mica, coated on the outer surface with a radiation absorbing substance 57, such as lamp black or platinum black, which simulate black body characteristics.

The structure of FIGURE 7 is drawn to full scale, again with the exception of the number of vanes 56 shown, the illustrated number being fewer for clarity in the drawing. The number of vanes will be chosen to be such that incident radiation throughout the greatest excepted range of angular misalignment of the space vehicle impinges only upon the black body vane surfaces 57 and does not pass between vanes. Typically, the housing or enclosure 49 may be $1/16''$ glass, the plates 51 may be $1/32''$ aluminum while the rods 52 may be $1/16''$ diameter aluminum, the bearings 53 may be jewel or other hard material, and the rotatable plates 55 may be 5 mils thick aluminum foil. As best seen in FIGURE 8 the black body coating 57, which may again be lamp black or platinum black, does not extend to contact the end plates 55 in order to prevent heat loss from the coating to the thermally conductive aluminum.

Vehicle misalignment is of two basic types. One type may occur for example when a vehicle comes out of eclipse and finds itself with a fixed misorientation relative to the sun. This zero angular rate type of misalignment can be corrected by the module devices to reorient the vehicle sunward, because a change of momentum is generated which is transferable to the vehicle to cause such reorientation. A second type of misalignment may occur as a result of an internally or externally generated momentum impulse acting upon the vehicle. This second type of misalignment is characterized by an angular rate of misalignment and cannot be corrected by the module devices alone. In this latter case the modules act as motion damping devices which absorb the momentum impulse to brake the vehicle and prevent the vehicle from going into uncontrolled spin. The braked vehicle position may then be somewhat angulated to the desired orientation, but the radiation pressure surface as shown in FIGURE 1 at 27 will tend to reestablish the sunward orientation, and the modules 28 will damp this motion to provide proper orientation with minimum overshoot.

These two types of misalignment are both illustrated in FIGURE 3 by the dashed lines 46a which make an angle $\alpha$ with the normals to the plane of reflectors 36, the angle $\alpha$ designating either the maximum angle of misalignment occuring in the first stated type of misalignment or the ultimate misalignment angle produced by a momentum impulse resulting in the second type of misalignment. The dashed lines 46a are thus seen to now represent the direction of the incident radiation upon the module 28. In either case, it is clear that the radiation input to the radiometer housing 29 increases rapidly due to the action of its amplifying reflector 36 which directs additional radiation upon the rear portion of the housing 29 as a consequence of the angle $\alpha$, while conversely the radiation input to radiometer housing 30 decreases due to the blocking reflector 35 and the same angle $\alpha$.

Consequently, the momentum wheels in housings 29 and 30 respectively accelerate and decelerate to produce a net torque on the module 28 in the sense designated by the rotation arrow 48. This torque change is transferred to the space vehicle through the fixed structure of the module and produces a rotational force on the vehicle in the sense designated by the rotation arrow 48. This rotational force on the vehicle is observed to be in such sense as to tend to reduce the angle $\alpha$ and realign the vehicle so that the incident radiation on the modules 28 is again as indicated by the arrows 44, 45 and 46. The ultimate effect on the vehicle of the rotational force exerted thereon by the modules 28 depends upon the cause of the misalignment, as previously set forth.

In the first type of misalignment the entire torque operative on the vehicle is that produced by the modules 28, so that rotation of the vehicle results and the desired realignment occurs, the momentum wheels in housings 29 and 30 respectively decelerating and accelerating as the realignment progresses until their rotational speeds are again equal and the net torque is zero when the angle $\alpha$ reduces to zero. The rotational realignment characteristic of a single module constructed as shown in FIGURES 3, 4 and 5 is illustrated in the graph of FIGURE 9.

In the second type of misalignment the torques operative on the vehicle are sequential in nature, the first torque being that which results from the internally or externally generated impulse which imparts an undesired angular momentum of the vehicle and creates misalignment which causes the generation of the torque produced by the modules. The modules act as momentum absorbers or momentum cancelling devices for the undesired vehicular angular momentum since the module generated torque is counter to and offsets the impulse produced first torque. The modules thus damp and brake the vehicular motion which would otherwise result in uncontrolled spin. The braked vehicle position in the absence of a radiation pressure surface such as 27 will then be the steady state misalignment angle $\alpha$. The presence of such a radiation pressure surface will ultimately produce realignment as previously described. The damping characteristic of a single module constructed as shown in FIGURES 3, 4 and 5 is illustrated in the graph of FIGURE 10. As is evident from FIGURES 9 and 10, the choice of parameters is such as to provide nearly optimum transient response, the system being desirably slightly oscillatory with an overshoot of about five percent (5%).

For an understanding of the basic operation of the radiometer devices illustrated in FIGURES 3 through 8, reference should be now made to FIGURES 11 and 12. The functional counterparts of the three surface radiometer of FIGURES 3, 4 and 5 in the diagrammatic showing of FIGURE 11 are designated on the latter by primed reference characters, that is, the vane 39' designates one of the cylinder vanes 39, the cold surface ($Tc$) 42' represents the finned heat sink 42, and the hot surface ($T_h$) 43' represents the black body radiation absorber film 43. Similarly, the functional counterparts of the two surface radiometer of FIGURES 6, 7 and 8 in the diagrammatic showing of FIGURE 12 are designated on the latter by primed reference characters, that is, one of the mica vanes 56 is designated 56', the hot surface ($T_h$) designated 57' is the black body coating 57 of the vanes, and the cold surface ($Tc$) designated 49' is the glass enclosure or housing 49.

In FIGURE 11 the radiometer effect is produced by the flow of gas molecules from the hot surface 43' to the cold surface 42' which molecules strike the inclined vane 39' during transit and produce a useful radiometer pressure thereon in the direction of $P_r$, which pressure can be shown to be a maximum when the angle of vane inclination $\beta$ is equal to 41°. The vanes 39 in the showing of FIGURE 5 are of course so inclined, but the inclination of vanes 56 of FIGURE 6 are governed by other considerations to be subsequently discussed.

Upon striking the cold surface 42' the molecules of the rarefied gas give up most of their residual energy so that any subsequent collisions with the surface of vane 39' which faces toward the cold surface 42' will produce very little undesired counter pressure to $P_r$. The illustrated configuration of the finned heat absorber 42 in FIGURE 5 assures many collisions of each gas molecule with the cold surface before the molecule can find its way back toward the hot surface 43' and possibly impinge on the vane 39' in transit.

When a low energy molecule coming from the cold surface 42' strikes the hot surface 43' its energy level is increased as a function of the temperature difference between the hot and cold surfaces. Assuming that the distance between the hot and cold surfaces is substantially less than the mean free path of the gas molecules, then the now high energy gas molecule will usually strike the inclined vane 39' in transit before colliding with other gas molecules which might be at lower energy levels and which would hence siphon off the energy of the high energy molecule. The vane 39' is thus given another kick in the desired direction and this process is continuously repeated with all of the gas molecules and vanes 39 of the radiometer structure of FIGURES 3 to 5 to produce rotation of the momentum wheels 38.

Since the temperature $T_c$ of the heat sink 42 can be and is held substantially constant, a change in angular velocity of the momentum wheels 38 requires a change in the temperature $T_h$ of the absorber 43. This is achieved by variation in the incident radiation, the temperature rising with an increase in radiation and falling with a decrease. In the configuration of FIGURE 3 it should be now clear that the incidence of equal amounts of radiation on the absorbers of housings 29 and 30 when $\alpha = 0$ produces equal hot temperatures $T_h$. Assuming equal cold temperatures $T_c$, geometric configurations and gas pressures for the housings 29 and 30 and momentum wheels 38, then the angular velocities of the momentum wheels 38 will be equal in magnitude and opposite in sense and will balance one another.

Without the reflectors 36 it is clear that a variation of incident radiation on the housings 29 and 30 will occur for $\alpha \neq 0$, but that all such variation is due solely to direct radiation and that a maximum would not be reached until $\alpha = 90°$. Moreover, the variation gradient would be relatively small. Since in the contemplated utilization of the modules 28 only operation within a restricted angle about $\alpha = 0$ is of relevance, it is more important to arrange the configuration so as to produce maximum gain for small angular misalignments. This is achieved by utilization of the reflectors 36, for which an amplification factor $n$ may be defined as the ratio of reflector distance from the axis of momentum wheel rotation, to the radius of the cylindrical absorbing film in the housing.

For the illustrated configuration $n = 3$ and the corresponding maximum angular misalignment beyond which there is no further amplification or radiation increase is $\alpha = 19.5°$. The limiting factor, outside of overall volume taken up by the assembly is the range of misalignment for which the reflector amplification is applicable, since, when the reflector is a large distance away, the entire rear surface of the absorber will be quickly covered. For example, a gain amplification of seven can be obtained with the reflector 36 located six radii from the momentum wheel axis, but the corresponding range of maximum angular misalignment is reduced to $\alpha = 9.6°$. The utilization of reflectors 36 to produce effective radiation amplification is of course also applicable to the modules when momentum wheels of the two surface type illustrated in FIGURES 6 to 8 are employed.

In FIGURE 12, as distinguished from FIGURE 11, the radiometer effect is not produced by the impingement of high energy gas molecules upon a vane surface as the molecule transits from a hot surface to a cold surface. The radiometer pressure $P_r$ is produced in this case by gas molecules which are at low energy when they strike the vane carried hot surface 57', and which molecules then absorb energy from the hot surface and leave the surface at high energy. The reaction of the high energy molecules leaving the hot surface 57' produces the radiometer pressure $P_r$ which is exerted normal to the surface. Since the hot surface 57' is physically on the vane 56', the vane is subjected to the radiometer pressure which generates a torque thereon.

The vane absorber surfaces 57 of FIGURES 6 to 8 are heated directly by radiation passing through the glass housing and impinging thereon, the hot surface temperature $T_h$ being a function of the radiation level as was the case with the absorber structure of FIGURES 3 to 5. The glass housing 49 is in this case the cold surface $T_c$ and is designated as 49' in FIGURE 12, the high energy gas molecules leaving the vane hot surface 57' impinging thereon and giving up their energy thereto.

While FIGURE 12 illustrates the vane 56' as oriented with its plane along a radius of the housing 49' to provide maximum torque from $P_r$ which is exerted normal to the vane surface, this would generally not be the configuration adopted. This is so because a practical device utilizes a large number of vanes relatively closely spaced, and the high energy molecules coming off of the hot surface 57 of one vane 56 would strike the immediately adjacent cool mica face of the next trailing vane and substantially cancel out the torque $P_r$ produced in coming off the hot surface. Consequently, the vanes 56 are angled or inclined as shown in FIGURE 6 so that the high energy molecules will be directed toward the heat sink of the housing 49 and not toward other vanes 56. Such inclination, however, reduces the torque exerted since the length of the moment arm of the normal force due to $P_r$ is now decreased. An accommodation between these two factors is thus required and the vane inclination is thus seen to depend upon the number and size of the vanes.

The sun pointing radiometer devices described hereinbefore operate by change of momentum transfer from the devices to the vehicle which carries them. Since the devices shown and described experience momentum changes when the angular velocities of the momentum wheels 38 change, it is important for design purposes to be able to evaluate the factors which affect the momentum change transfer from the momentum wheels 38 to their enclosing structure, and hence to the vehicle itself. The basic equation defining the reaction torque $L_r$ on the momentum wheel enclosure is given by, $$L_r = i\ddot{\theta} = L - C\dot{\theta} \qquad (1)$$

where:

$i$ = moment of inertia of the momentum wheel
$\ddot{\theta}$ = angular acceleration of the momentum wheel
$L$ = radiometer torque on the momentum wheel
$C$ = damping of the momentum wheel by rarefied gas in the enclosure
$\dot{\theta}$ = angular velocity of the momentum wheel.

The Laplace transform of Equation 1 is $$L_r(s) = L(s) \frac{T_m s}{1 + T_m s} \qquad (2)$$

where $T_m = i/c$ = motor time constant of the momentum wheel

Evaluation of Equation 2 requires evaluation of the term $L(s)$ which represents the transform of the radiometer torque on the momentum wheel.

For the three surface radiometer configuration, the radiometer torque is given by $$L = K_r \left[ \sqrt{\frac{T_h}{T_c}} - 1 \right] \qquad (3)$$

and for the two surface radiometer configuration, the radiometer torque is given by $$L = K'_r \left[ \sqrt{\frac{T_h}{T_c}} - 1 \right] \qquad (4)$$

where $K_r$ and $K'_r$ are constants determined by the configuration. Equations 3 and 4 are seen to be of exactly the same form so that they may be now considered together. For both cases the hot temperature $T_h$ can be considered to have a steady state fixed temperature component $T_h(0)$ plus an incremental temperature component $T'_h$ which is much smaller than $T_h(0)$. Additionally, the cold temperature $T_c$ can be considered constant at a steady state value of $T_c(0)$ because the thermal mass of the heat sink is sufficiently large to preclude any significant change during the interval of interest. Thus, $$\sqrt{\frac{T_h}{T_c}} = \sqrt{\frac{T_h(0) + T'_h}{T_c(0)}} \quad (5)$$

and when Equation 5 is expanded, substituted into Equations 3 and 4, and then transformed, the Laplace transform becomes $$L(s) = K_m T'_h(s) \quad (6)$$

where $$K_m = \frac{Kr \text{ (or } K'r)}{2[T_h(0).T_c(0)]^{1/2}} = \text{motor gain coefficient}$$

and Equation 2 becomes $$L_r(s) = \frac{KmTms}{(1+Tms)} T'_h(s) \quad (7)$$

The final step in evaluation of Equation 7 requires evaluation of the incremental hot temperature thermal transfer function $T'_h(s)$ which can be derived from the differential equation expressing conservation of energy for the heat flow, $$Q_a = \rho CV \frac{dT_h}{dt} + Q_e + Q_c + Q_g \quad (8)$$

where $Q_a$ = rate of heat absorption by absorber
   $= RF(\alpha)\delta$
$\rho$ = density of absorber
$C$ = specific heat of absorber material
$V$ = volume of absorber material
$Q_e$ = rate of heat emission
   $= \epsilon \sigma T_h^4 A$
$Q_c$ = rate of heat conduction to the enclosure
$Q_g$ = rate of heat conduction by the rarefied gas
$R$ = solar constant = $1.4 \times 10^6$ ergs/cm.$^2$—sec.
$F(\alpha)$ = intercepted area of solar illumination
$\delta$ = absorption coefficient of absorber
$\epsilon$ = emissivity of the absorber
$\sigma$ = Stefan-Boltzmann constant
$A$ = equivalent area of emission and in which the terms $Q_c$ and $Q_g$ can be shown to be negligibly small.

The solution of Equation 8 and transformation thereof yields, $$T'_h(s) = \frac{F_\alpha(s)}{F_\alpha(0)} \cdot \frac{K_h}{(1+T_h S)} \quad (9)$$

where $$K_h = \frac{T_h(0)}{4} = \text{thermal coefficient}$$

$$T_h = \frac{\rho CV T_h(0)}{4R\delta F_\alpha(0)} = \text{thermal time constant}$$

so that Equation 7 becomes $$L_r(S) = \frac{F_\alpha(s)}{F_\alpha(0)} \cdot \frac{KmKhTms}{(1+Tms)(1+T_h s)} \quad (10)$$

and for a pair of momentum wheels symmetrically arranged so that $F_a(0)$ is the same for both, as in FIGURE 3, the total transform function is, $$L_r(s) = \left[\frac{F_\alpha+(s)}{F_\alpha+(0)} + \frac{F_\alpha-(s)}{F_\alpha-(0)}\right] \frac{KmKhTms}{(1+Tms)(1+Ths)} \quad (11)$$

which for a determined structure becomes $$L_r(S) = K_d\left[\frac{F_\alpha+(s)}{F_\alpha+(0)} + \frac{F_\alpha-(s)}{F_\alpha-(0)}\right]$$

with $$K_d = \frac{KmKhTms}{(1+Tms)(1+Ths)}$$

The factor $K_d$ bears critical examination because maximization of $L_r(S)$, the momentum transfer, is basically affected by the maximization of $K_d$. Since in the applications of concern the oscillation frequency of an occurring vehicular misalignment will be low, in general the denominator $TmS$ product will be small compared to unity and the $(1+TmS)$ denominator factor can be replaced by unity. Additionally, the thermal time constant $T_h$ can be made small by proper choice of the controllable factors $\rho$, $c$, $v$, $\delta$, so that the denominator $T_hS$ product can also be made small compared to unity. Thus, the factor $K_d$ reduces to $K_d = KmKhTms$, but the $KmKh$ product can be shown to be directly proportional to the eighth root of the ratio of absorption to emissivity coefficients, that is $KmKh\alpha[\delta/\epsilon]^{1/8}$, which for all practical substances is substantially constant. Therefore, since no control is exercisable over the frequency factor $S$, it is clear that $K_d \alpha T_m$, and maximization of momentum change transfer $L_r(S)$ as a function of the radiometer structure basically follows with maximization of the motor time constant $T_m = i/c$.

The bracketed $F(\alpha)$ factor in Equation 11 is directly affected by the incorporation of the reflectors 36 into the structure of FIGURE 3 and can be shown to be equal to $2(n+1)\alpha(S)$ so that Equation 11 can also be written for this configuration as, $$L_r(S) = 2(n+1)K_d\alpha(S) \quad (12)$$

where "$n$" is the previously defined amplification factor due to the position of the reflector 36.

FIGURE 13 illustrates one possible variation of the module structure of FIGURE 3, differing from the latter in that the front blocking reflectors 58 curve about the radiometer housings 59 so that no direct radiation is incident on the housings 59 for the condition of zero misalignment, and in that the rear amplifying reflectors 60 are inclined forward at an angle $\gamma$ so that equal radiation is reflected onto the radiometer housings at zero misalignment. For this configuration it can be shown that $$L_r(S) = 2Ctn\gamma K_d\alpha(S) \quad (13)$$

for $\gamma \neq 0$.

FIGURE 14 illustrates a module structure which combines features of the devices shown in both FIGURES 3 and 13, and differs therefrom in that it is mechanized to be controllable so as to function as a sun pointing device or as a device for producing a predetermined desired solar misalignment. The front blocking reflectors 61 are similar to the reflectors 35 of FIGURE 3, but are laterally controllably shiftable by means of a reversible motor 62 engaged with a drive system 63 shown for illustrative purposes only as a rack and pinion device. Under conditions of alignment in the sense used hereinbefore ($\alpha=0$), the reflectors 61 can be driven laterally to cause direct radiation to fall upon the radiometers 64 in equal or unequal quantities with the inequality being in either direction. The rear amplifying reflectors 65 are similar to the reflectors 60 of FIGURE 13, but are additionally swingable about pivots 66 by means of reversible motors 67 and 68 to incline the reflectors at any desired angles $\gamma_1$, and $\gamma_2$, which angles may be equal or unequal.

The motors 62, 67 and 68 are energized and deenergized by control device 69 to shift the front reflectors 61 and/or swing either or both of the rear reflectors 65. For example, consider the case where $\gamma_1=\gamma_2=0$ and the reflectors 61 are positioned to provide equal direct radiation on the radiometers 64 under conditions where $\alpha=0$. If it is now desired to misalign the module structure by a predetermined amount, an appropriate control signal can be sent to the control device 69 via input 70 to operate any of the motors 62, 67 and/or 68 to thereby shift and/or swing the reflectors 61 and 65 in such directions as to control the total differential radiation input to the radiometers 64 to swing the module as desired. One way of generating such a control signal is illustrated in FIGURE 15 to which attention should be now directed.

In FIGURE 15 the momentum wheels of the left and right radiometers 64 of FIGURE 14 are designated respectively as 71 and 72, each momentum wheel having affixed to its upper rotatable end a plurality of magnets 73 equispaced about a circle concentric with the axis of rotation of the momentum wheel. Disposed adjacent to the magnet circles of the respective momentum wheels are pick-up coils 74 and 75 having output signal lines 76 and 77 leading to digital to analog converter devices 78 and 79. The outputs of devices 78 and 79 are fed to a differential amplifier 80 having an output signal line 81 which in turn drives one input of a comparator 82, the comparator having a second input 83 and an output line 84.

The rotating magnets 73 induce pulses in the pickup coils 74 and 75 which cause the digital to analog converters 78 and 79 to generate DC signals whose amplitudes are directly proportional to the pulse rates. When the momentum wheels are rotating at the same rate, the pulse rates will be equal and so will the corresponding DC signals. The output of the differential amplifier 80 is therefore zero or a predetermined reference level so that the indicated angle of actual misalignment $\alpha_A$ which appears on output line 81 is zero. Under conditions where the desired misalignment angle $\alpha_D$ is zero, the signal or comparator input line 83 will be either zero or the same predetermined reference level as that appearing on line 81 and which corresponds to $\alpha_A=0$. The comparator 82 thus generates a signal on its output line 84 indicating that $\alpha_A=\alpha_D$ and that the misalignment error angle $\alpha_E=0$. The $\alpha_E$ signal can be routed to the control input line 70 of the control device 69 in FIGURE 14 to control the motors 62, 67 and 68. Since $\alpha_E=0$ nothing will occur.

Consider now that ground control wishes to incline the vehicle at a finite misalignment angle $+\alpha_D$. A radio signal can be transmitted which will cause a signal corresponding to $+\alpha_D$ to be injected into the comparator input 83. Since the $\alpha_A$ signal still corresponds to $\alpha_A=0$, there will be generated an error signal $\alpha_E$ initially equal to $+\alpha_D$. This signal then could cause the control device 69 to activate motor 62 and begin to shift reflector 61 toward the left to reduce the radiation input to the left radiometer and increase the radiation input to the right radiometer. The control device might simultaneously activate motors 67 and 68 to respectively begin to decrease $\gamma_1$ and increase $\gamma_2$ to similarly affect the input to the radiometers.

Consequently, momentum wheels 71 and 72 will respectively decelerate and accelerate to decrease the pulse rate input to device 78 and increase the pulse rate input to device 79. The DC signal inputs to the differential amplifier 81 are now unbalanced in such a direction as to produce on output line 81 a signal $+\alpha_A$ which the comparator 82 compares with the fixed control input signal $+\alpha_D$ and accordingly reduces the magnitude of error signal $+\alpha_E$. The reduced error signal of course is routed to control device 69 which controls the motors accordingly. The process is continued until the error signal $\alpha_E$ reduces to zero, at which time the actual angular misalignment $\alpha_A$ equals the desired misalignment $+\alpha_D$. If desired, anticipating circuitry may also be employed to preclude or minimize overshoot. It will be appreciated that the system just described can also be utilized to correct rather than produce misalignment.

Finally, consider the embodiment of FIGURE 16. This is a diagrammatic end view of one half of a modification of the device of FIGURE 13 which is specifically designed to produce a torque gradient which is non-linear as a function of angular misorientation $\alpha$ in distinction to the linear torque gradients of the structures of FIGURES 3 and 13, the linear nature of these earlier described devices being indicated by Equations 12 and 13. The non-linear torque characteristic results from appropriate shaping of the rear amplifying reflector 85, in the illustrated case the reflector contour being parabolic.

The non-linearity of the torque function is clearly observed in the graph of FIGURE 17 from which it is seen that the torque function is characterized by a gradient which increases positively up to the deviation at which the radiation amplification becomes constant. In the graph, the function $f(\alpha)$ is defined as the differential intercepted area of solar radiation per unit height of reflector, thus $$f(\alpha) = f(\alpha+) + f(\alpha-) = \frac{1}{l}\left[\frac{F(\alpha+)+F(\alpha-)}{F(0)} - 2\right]$$

where $$f(\alpha+) = \frac{1}{l}\frac{F(\alpha+) - F(0)}{F(0)}$$

$$f(\alpha-) = \frac{1}{l}\frac{F(\alpha-) - F(0)}{F(0)}$$

and $F(\alpha)$ is the total intercepted area of solar radiation as shown in FIGURE 16. Similarly, other reflector configurations may be devised to produce other types of torque gradient characteristics.

Having now described my invention in connection with particularly illustrated embodiments thereof, variations and modifications of my invention may now occur from time-to-time to those persons normally skilled in the art without departing from the essential scope or spirit of my invention, and accordingly it is intended to claim my invention broadly as well as specificaly as indicated by the appended claims.

I claim:

1. A momentum transfer device, comprising in combination, a pair of substantially identical radiometers each of which includes a radiation transparent housing and a rotatable momentum wheel disposed for rotation therewithin about a fixed axis, radiation blocking means having a predetermined indexed position relative to said radiometer housnigs disposed in front of said radiometers to intercept a portion of radiation directed toward said radiometers from a particularly positionable source of radiation, and means mounting said radiometer in such fixed relation to one another that incident radiation from said particularly positionable source causes the momentum wheels to rotate counter to one another about their respective axes in such relative sense that any torque exerted on each radiometer housing by a change of angular veloicty of the momentum wheel therewithin is in such direction as to tend to shift the entire device to equalize the radiation incident upon the said pair of radiometer housings.

2. A momentum transfer device, comprising in combination, a pair of substantially identical radiometers each of which includes a radiation transparent housing and a rotatable momentum wheel disposed for rotation therewithin about a fixed axis, radiation blocking means having a predetermined indexed position relative to said radiometer housings disposed in front of said radiometers to intercept a portion of raidation directed toward said radiometers from a particularly positionable source of radiation, means mounting said radiometers in such fixed relation to one another that incident radiation from said particularly positionable source causes the momentum wheels to rotate counter to one another about their respective axes in such relative sense that any torque exerted on each radiometer housing by a change of angular velocity of the momentum wheel therewithin is in such direction as to tend to shift the entire device to equalize the radiation incident upon the said pair of radiometer housings, and radiation reflecting means disposed behind said radiometers to intercept and reflect a portion of the radiation from the particularly positionable source of radiation which is neither intercepted by said front radiation blocking means nor directly incident upon said radiometers.

3. A momentum transfer device, comprising in combination, a pair of substantially identical radiometers each of which includes a radiation transparent housing and a rotatable momentum wheel disposed for rotation therewithin about a fixed axis, radiation blocking means having a predetermined indexed position relative to said radiometer housings disposed in front of said radiometers to intercept a portion of radiation directed toward said radiometers from a particularly positionable source of radiation, means mounting said radiometers in such fixed relation to one another that incident radiation from said particularly positionable source causes the momentum wheels to rotate counter to one another about their respective axes in such relative sense that any torque exerted on each radiometer housing by a change of angular velocity of the momentum wheel therewithin is in such direction as to tend to shift the entire device to equalize the radiation incident upon the said pair of radiometer housings, and radiation reflecting means disposed behind said radiometers to intercept and reflect a portion of the radiation from the particularly positionable source of radiation which is neither intercepted by said front radiation blocking means nor directly incident upon said radiometers, said radiation reflectng means being so oriented relative to said radiometers that radiation incident thereupon is reflected onto a radiometer housing only when the directly incident radiation on the pair of radiometer housings is unequal, the reflected radiation being directed upon that housing receiving the greatest amount of direct radiation.

4. A momentum transfer device, comprising in combination, a pair of substantially identical radiometers each of which includes a radiation transparent housing and a unidirectionally rotatable momentum wheel disposed for rotation therewithin about a fixed axis, radiation blocking means disposed in front of said radiometers and radiation reflecting means disposed behind said radiometers each effective to intercept a portion of the radiation directed toward said radiometers from a particularly positionable source of radiation, and means mounting said radiometers and radiation blocking means and radiation reflecting means in such fixed relation to one another that radiation from said particularly positionable source is directed onto said radiometer housings only by reflection from said radiation reflecting means and causes the momentum wheels to rotate counter to one another about their respective axes in such relative sense that any torques exerted on the radiometer housings by changes of angular velocity of the momentum wheels therewithin due to an unbalanced change in the radiation directed upon the radiometer housings is in such direction as to tend to shift the entire device to equalize the radiation directed upon the radiometers by the said radiation reflecting means.

5. A momentum transfer device, comprising in combination, a pair of substantially identical radiometers each of which includes a radiation transparent housing and a unidirectionally rotatable momentum wheel disposed for rotation therewithin about a fixed axis, radiation blocking means disposed in front of said radiometers, and radiation reflecting means disposed behind said radiometers each effective to intercept a portion of the radiation directed toward said radiometers from a particularly positionable source of radiation, means mounting said radiometers and radiation blocking and reflecting means in such relation to one another that incident radiation from said particularly positionable source causes the momentum wheels to rotate counter to one another about their respective axes in such relative sense that any torque exerted on each radiometer housing by a change of angular velocity of the momentum wheel therewithin is in such direction as to tend to shift the entire device to equalize the radiation incident upon the said pair of radiometer housings, and selectively operable means for causing said radiation blocking means to block more or less radiation from a selected one of said pair of radiometers.

6. A momentum transfer device, comprising in combination, a pair of substantially identical radiometers each of which includes a radiation transparent housing and a unidirectionally rotatable momentum wheel disposed for rotation therewithin about a fixed axis, radiation blocking means disposed in front of said radiometers, and radiation reflecting means disposed behind said radiometers each effective to intercept a portion of the radiation directed toward said radiometers from a particularly positionable source of radiation, means mounting said radiometers and radiation blocking and reflecting means in such relation to one another that incident radiation from said particularly positionable source causes the momentum wheels to rotate counter to one another about their respective axes in such relative sense that any torque exerted on each radiometer housing by a change of angular velocity of the momentum wheel therewithin is in such direction as to tend to shift the entire device to equalize the radiation incident upon the said pair of radiometer housing, and selectively operable means for causing said radiation reflecting means to reflect more or less radiation upon a selected one of said pair of radiometers.

7. A momentum transfer device, comprising in combination, a radiometer having a radiation transparent housing and a continuously unidirectionally rotatable momentum wheel disposed therewithin for rotation about a fixed axis, means for securing said radiometer housing to an object which it is desired to orient about an axis parallel to that of the said momentum wheel, radiation blocking means having a predetermined indexed position relative to said radiometer housing disposed to intercept a portion of radiation directed toward said radiometer from a particularly positionable source of radiation while permitting a portion of such radiation to be incident upon said radiometer so that the radiometer momentum wheel is characterized by a steady state non-zero angular velocity when subjected to radiation from such particularly positionable source, the rotational sense of said momentum wheel being so chosen that the torque exerted on the radiometer housing by a change of angular velocity of the momentum wheel due to a change in the incident radiation is always in such direction as to tend to shift the radiometer housing and radiating blocking means about the momentum wheel axis relative to the radiation source so as to oppose the change in the said steady state angular velocity of the momentum wheel.

8. A momentum transfer device, comprising in combination,
 (1) a radiometer including,
  (a) a radiation transparent generally cylindrical housing having its inside cylindrical surface covered by a relatively thin film having black body characteristics,
  (b) a heat sink extending coaxially through said housing and outward therebeyond,
  (c) a generally cylindrical sleeve form of momentum wheel disposed coaxially within said housing and supported for continuous unidirectional rotation about the common cylindrical axis with the outer surface of the sleeve disposed adjacent to the inner surface of the said black body film, said sleeve having a plurality of circumferentially positioned longitudinally extending vanes cut out of and turned inward at acute angles from the cylindrical sleeve wall along longitudinally extending lines,
 (2) means for securing said radiometer housing to an object which it is desired to orient about an axis parallel to that of said momentum wheel, (3) radiation blocking means having a predetermined indexed position relative to said radiometer housing disposed to intercept a portion of radiation directed toward said radiometer from a particularly positionable source of radiation while permitting a portion of such radiation to be incident upon said radiometer housing so that the said momentum wheel is characterized by a steady-state non-zero angular velocity when subjected to radiation from such particularly positionable source, the rotational sense of said momentum wheel being so chosen that the torque exerted on the radiometer housing by a change of angular velocity of the momentum wheel due to a change in the incident radiation is always in such direction as to tend to shift the radiometer housing and radiation blocking means about the momentum wheel axis relative to the radiation source so as to oppose the change in the said steady state angular velocity of the momentum wheel.

9. A momentum transfer device, comprising in combination, (1) a radiometer including,
   (a) a radiation transparent generally cylindrical housing having its inside cylindrical surface covered by a relatively thin film having black body characteristics,
   (b) a heat sink extending coaxially through said housing and outward therebeyond,
   (c) a generally cylindrical sleeve form of momentum wheel disposed coaxially within said housing and supported for continuous unidirectional rotation about the common cylindrical axis with the outer surface of the sleeve disposed adjacent to the inner surface of the said black body film, said sleeve having a plurality of circumferentially positioned longitudinally extending vanes cut out of and turned inward at acute angles from the cylindrical sleeve wall along longitudinally extending lines, (2) means for securing said radiometer housing to an object which it is desired to orient about an axis parallel to that of said momentum wheel, (3) radiation blocking means having a predetermined indexed position relative to said radiometer housing disposed to intercept a portion of radiation directed toward said radiometer from a particularly positionable source of radiation while permitting a portion of such radiation to be incident upon said radiometer housing so that the said momentum wheel is characterized by a steady-state non-zero angular velocity when subjected to radiation from such particularly positionable source, (4) radiation reflecting means having a predetermined indexed position relative to said radiometer housing disposed to intercept and reflect a portion of the radiation from the particularly positionable source of radiation which is neither intercepted by said radiation blocking means nor directly incident upon said radiometer housing, the rotational sense of said momentum wheel being so chosen that the torque exerted on the radiometer housing by a change of angular velocity of the momentum wheel due to a change in the incident radiation is always in such direction as to tend to shift the radiometer housing and radiation blocking and reflecting means about the momentum wheel axis relative to the radiation source so as to oppose the change in the said steady state angular velocity of the momentum wheel.

10. A momentum transfer device, comprising in combination, (1) a radiometer including,
   (a) a radiation transparent generally cylindrical housing,
   (b) a generally cylindrical momentum wheel disposed coaxially within said housing and supported by housing-carried bearings for continuous unidirectional rotation about the common cylindrical axis, said momentum wheel including a plurality of low thermal conductivity longitudinally extending parallel vanes positioned circumferentially on a circle of diameter less than that of said cylindrical housing and held in fixed position relative to one another by a pair of opposite end plates, said vanes being oriented so that their planes are all inclined at an acute angle to a radius of the momentum wheel passing therethrough, and each such vane being coated on its outer surface with a relatively thin film having black body characteristics, (2) means for securing said radiometer housing to an object which it is desired to orient about an axis parallel to that of said momentum wheel, (3) radiation blocking means having a predetermined indexed position relative to said radiometer housing disposed to intercept a portion of radiation directed toward said radiometer from a particularly positionable source of radiation while permitting a portion of such radiation to be incident upon said radiometer housing so that the said mementum wheel is characterized by a steady-state non-zero angular velocity when subjected to radiation from such particularly positionable source, the rotational sense of said momentum wheel being so chosen that the torque exerted on the radiometer housing by a change of angular velocity of the momentum wheel due to a change in the incident radiation is always in such direction as to tend to shift the radiometer housing and radiation blocking means about the momentum wheel axis relative to the radiation source so as to oppose the change in the said steady state angular velocity of the momentum wheel.

11. A momentum transfer device, comprising in combination, (1) a radiometer including,
   (a) a radiation transparent generally cylindrical housing,
   (b) a generally cylindrical momentum wheel disposed coaxially within said housing and supported by housing-carried bearings for continuous unidirectional rotation about the common cylindrical axis, said momentum wheel including a plurality of low thermal conductivity longitudinally extending parallel vanes positioned circumferentially on a circle of diameter less than that of said cylindrical housing and held in fixed position relative to one another by a pair of opposite end plates, said vanes being oriented so that their planes are all inclined at an acute angle to a radius of the momentum wheel passing therethrough, and each such vane being coated on its outer surface with a relatively thin film having black body characteristics, (2) means for securing said radiometer housing to an object which it is desired to orient about an axis parallel to that of said momentum wheel, (3) radiation blocking means having a predetermined indexed position relative to said radiometer housing disposed to intercept a portion of radiation directed toward said radiometer from a particularly positionable source of radiation while permitting a portion of such radiation to be incident upon said radiometer housing so that the said momentum wheel is characterized by a steady-state non-zero angular velocity when subjected to radiation from such particularly positionable source, (4) radiation reflecting means having a predetermined indexed position relative to said radiometer housing disposed to intercept and reflect a portion of the radiation from the particularly positionable source of radiation which is neither intercepted by said radiation blocking means nor directly incident upon said radiometer housing, the rotational sense of said momentum wheel being so chosen that the torque exerted on the radiometer housing by a change or angular velocity of the momentum wheel due to a change in the incident radiation is always in such direction as to tend to shift the radiometer housing and radiation blocking and reflecting means about the momentum wheel axis relative to the radiation source so as to oppose the change in the said steady state angular velocity of the momentum wheel.

12. A momentum transfer device, comprising in combination,
(1) a pair of spaced apart, side by side parallel radiometers each including,
(a) a radiation transparent generally cylindrical housing having its inside cyclindrical surface covered by a relatively thin film having black body characteristics,
(b) a heat sink extending coaxially through said housing and outward therebeyond,
(c) a generally cylindrical sleeve form of momentum wheel disposed coaxially within said housing and supported for continuous unidirectional rotation about the common cylindrical axis with the outer surface of the sleeve disposed adjacent to the inner surface of the said black body film, said sleeve having a plurality of circumferentially positioned longitudinally extending vanes cut out of and turned inward at acute angles from the cylindrical sleeve wall along longitudinally extending lines,
(2) a radiation blocking front reflector positioned in front of the radiometer housings and extending the full length thereof effective to block equal amounts of radiation from each radiometer, which radiation is directed toward said radiometers orthogonally to the plane defined by the spaced apart parallel axes of the radiometer momentum wheels,
(3) radiation reflecting rear reflectors positioned behind said radiometer housings and extending the full length thereof effective to intercept and reflect forward equal amounts of radiation from a radiation source which directs radiation toward said radiometers orthogonally as aforesaid, the vanes of the radiometer momentum wheels being so angulated that when the momentum transfer device is viewed endwise front downward the left and right momentum wheels rotate respectively counterclockwise and clockwise.

13. The momentum transfer device as set forth in claim 12 wherein said front reflector blocks only a portion of the direct radiation to each radiometer housing and permits a portion of the direct radiation to be incident thereon, and wherein said rear reflectors are in the form of flat planes oriented parallel to the plane defined by the spaced apart parallel axes of the radiometer momentum wheels.

14. The momentum transfer device as set forth in claim 12 wherein said front reflector blocks all of the direct radiation to said radiometer housings, and wherein said rear reflectors are each inclined at an angle to the plane defined by the spaced apart parallel axes of the radiometer momentum wheels so that one rear reflector directs the reflected radiation therefrom onto one radiometer housing and the other rear reflector directs the reflected radiation therefrom onto the other radiometer.

15. The momentum transfer device as set forth in claim 12 further including selectively operable means coupled to said front and rear reflectors effective when operated in one way to cause said front reflector to block more or less radiation from a selected one of said pair of radiometers and effective when operated in another way to cause said rear reflectors to reflect more or less radiation upon a selected one of said pair of radiometers.

16. A momentum transfer device, comprising in combination,
(1) a pair of spaced apart, side by side parallel radiometers each including,
(a) a radiation transparent generally cylindrical housing,
(b) a generally cylindrical momentum wheel disposed coaxially within said housing and supported by housing-carried bearings for continuous unidirectional rotation about the common cylindrical axis, said momentum wheel including a plurality of low thermal conductivity longitudinally extending parallel vanes positioned circumferentially on a circle of diameter less than that of said cylindrical housing and held in fixed position relative to one another by a pair of opposite end plates, said vanes being oriented so that their planes are all inclined at an acute angle to a radius of the momentum wheel passing therethrough, and each such vane being coated on its outer surface with a relatively thin film having black body characteristics,
(2) a radiation blocking front reflector positioned in front of the radiometer housings and extending the full length thereof effective to block equal amounts of radiation from each radiometer, which radiation is directed toward said radiometers orthogonally to the plane defined by the spaced apart parallel axes of the radiometer momentum wheels,
(3) radiation reflecting rear reflectors positioned behind said radiometer housings and extending the full length thereof effective to intercept and reflect forward equal amounts of radiation from a radiation source which directs radiation toward said radiometers orthogonally as aforesaid, the vanes of the radiometer momentum wheels being so angulated that when the momentum transfer device is viewed endwise front downward the left and right momentum wheels rotate respectively counterclockwise and clockwise.

17. The momentum transfer device as set forth in claim 16 wherein said front reflector blocks only a portion of the direct radiation to each radiometer housing and permits a portion of the direct radiation to be incident thereon, and wherein said rear reflectors are in the form of flat planes oriented parallel to the plane defined by the spaced apart parallel axes of the radiometer momentum wheels.

18. The momentum transfer device as set forth in claim 16 wherein said front reflector blocks all of the direct radiation to said radiometer housings, and wherein said rear reflectors are each inclined at an angle to the plane defined by the spaced apart parallel axes of the radiometer momentum wheels so that one rear reflector directs the reflected radiation therefrom onto one radiometer housing and the other rear reflector directs the reflected radiation therefrom onto the other radiometer.

19. The momentum transfer device as set forth in claim 16 further including selectively operable means coupled to said front and rear reflectors effective when operated in one way to cause said front reflector to block more or less radiation from a selected one of said pair of radiometers and effective when operated in another way to cause said rear reflectors to reflect more or less radiation upon a selected one of said pair of radiometers.

20. A momentum transfer device, comprising in combination,
(1) a pair of spaced apart, side by side parallel radiometers each including,
(a) a radiation transparent housing, and
(b) a momentum wheel disposed coaxially within said housing for unidirectional rotation therewithin, said momentum wheel including a plurality of vanes inclined at an acute angle to a momentum wheel radius passing therethrough,
(2) a radiation blocking front reflector positioned in front of the radiometer housings and extending the full length thereof effective to block equal amounts of radiation from each radiometer, which radiation is directed toward said radiometers othogonally to the plane defined by the spaced apart parallel axes of the radiometer momentum wheels,
(3) radiation reflecting rear reflectors positioned behind said radiometer housings and extending the full length thereof effective to intercept and reflect forward equal amounts of radiation from a radiation source which directs radiation toward said radiometers orthogonally as aforesaid, the vanes of the radiometer momentum wheels being so angulated that when the momentum transfer device is viewed endwise front downward the left and right momentum wheels rotate respectively counterclockwise and clockwise.

No references cited.

MILTON O. HIRSHFIELD, *Primary Examiner.*

DAVID X. SLINEY, *Examiner.*